3,847,861
POLYETHYLENE TEREPHTHALATE

Theodore Largman, Morristown, and Herman Stone, Convent Station, N.J., assignors to Allied Chemical Corporation, New York, N.Y.
No Drawing. Continuation of abandoned application Ser. No. 180,516, Sept. 14, 1971. This application Mar. 12, 1973, Ser. No. 340,636
Int. Cl. C08g 51/04
U.S. Cl. 260—40 R          12 Claims

ABSTRACT OF THE DISCLOSURE

Incorporated of finely particulate red phosphorous into unfilled or glass-filled polyethylene terephthalate provides a polymer having superior physical properties and flame retardance. Certain metal oxides exhibit a potentiating effect with the red phosphorous in regard to flame retardance.

---

This is a continuation of aplication Ser. No. 180,516, filed Sept. 14, 1971, now abandoned.

BACKGROUND OF THE INVENTION

Glass fiber-filled polyethylene terephthalate is a widely used structural and component plastic possessing numerous desirable characteristics. The glass fiber enhances the physical properties of the polyethylene terephthalate. In particular, Izod impact strength, initial modulus of elasticity, and ultimate tensile strength are all improved by the incorporation of 5 to 40 weight percent glass fiber into polyethylene terephthalate, hereinafter PET. However, the incorporation of glass fiber unfortunately has an adverse effect on the flammability of PET in comparison with non-glass-filled PET. In view of the increasing emphasis on providing flame resistant polymers in all possible applications, it would obviously be highly desirable to provide a glass-filled PET which nonetheless possessed fire retardancy superior to ordinary glass-filled PET. Needless to say, if such enhanced fire retardancy could be provided while simultaneously improving still further the physical properties of the glass-filled PET, a truly remarkable advancement in the state of the polymer art would be provided. Also, in many instances, it is desirable to provide a non-glass-filled PET which has superior fire retardance and physical properties in comparison with conventional unfilled PET.

SUMMARY OF THE INVENTION

This invention therefore relates to fire retardant PET and more particularly, to both unfilled and glass-filled PET having improved physical properties and flame retardance wherein said improvements are imparted by incorporating into said unfilled or glass-filled PET a finely particulate red phosphorous.

It has now been found in accordance with the instant invention that PET containing 5 to 40 weight percent glass fiber and having homogeneously dispersed therethrough from about 0.5 to about 10.0 weight percent, based on the weight of the glass-filled PET, of a finely particulate red phosphorous displays superior physical properties and flame retardancy in comparison with non-phosphorous-containing glass-filled PET. The term "finely particulate," as used herein, connotes a particle size of less than 100μ (microns), and preferably less than 25μ.

It has further been found in accordance with the instant invention that when about 2 to about 5 weight percent of certain metal oxides are incorporated into the glass-filled PET along with the red phosphorous, several unexpected and unusual beneficial results are achieved. First, although these oxides by themselves have no discernible fire retardant effect when incorporated in these amounts into glass-filled PET, when present in conjunction with red phosphorous, the fire retardant effectiveness of the latter is substantially enhanced. These metal oxides are therefore not true synergists but rather potentiating or enhancing agents. Alternatively, the same degree of fire retardance can be imparted to the PET by using metal oxide and less red phosphorous as can be achieved by a substantially greater quantity of red phosphorous alone. In general, it is desirable to use as little red phosphorous as will achieve the desired degree of physical property and fire retardancy improvement. The reason for this will be apparent when one considers the manner in which the red phosphorous is incorporated into the PET.

Ordinarily, PET in the form of powder or pellets and the desired amount of finely divided red phosphorous, metal oxide, and fiber glass, where desired, are mixed together and agitated in a low-intensity mixer to achieve a reasonably uniform semi-homogeneous mixture and this semi-homogeneous mixture then extruded to afford a glass-filled PET having the red phosphorous, metal oxide, and glass fiber uniformly distributed therethrough. As heretofore indicated, after homogeneous incorporation into the PET, the red phosphorous serves as an effective fire retardant. However, prior to such homogeneous incorporation, and in particular in the extruder chamber, any red phosphorous not actually already incorporated into the PET may ignite due to the high temperature conditions present (ordinarily from about 260° to about 300° C.). Therefore, the less red phosphorous which needs to be blended with the PET to achieve the desired degree of physical property and fire retardancy, the better from a saftey standpoint.

An alternate method of incorporating the red phosphorous, metal oxide, and fiber glass is to add all three with agitation to molten PET, which molten mixture is then extruded. Here again, because of the high temperatures involved, it is desirable for safety reasons to use as little red phosphorous as possible.

Finally, it is possible to prepare pelletized PET containing glass fiber and/or metal oxide and then admix these pellets with the red phosphorous and thereafter extrude. This method does not show any significant processing safety advantage over the above processes wherein metal oxide, red phosphorous, and glass fiber are simultaneously blended with the PET.

We have found the following metal oxides to be most effective as potentiating, i.e., enhancing, agents for red phosphorous: $MgO$, $TiO_2$, $ZnO$, $MoO_3$ and $Al_2O_3$, and particularly $MgO$. The following metal oxides are less effective although they do, to a more limited extend, enhance the effectiveness of red phosphorous: $Zr_2O_3$, $Cr_2O_3$, $WO_2O_3$, $B_2O_3$, $MnO_2$, $CdO$, $SnO$, $Pb_2O_3$, $Bi_2O_3$ and $Sb_2O_5$. The appropriate particle size range for the metal oxides is in general the same as for the red phosphorous, i.e. less than 100μ and preferably less than 25μ. If desired, mixtures of any or all of the above-indicated metal oxides can be used. If desired, other compounds known to possess activity as fire retardants when incorporated into PET can also be added, such as hexabromobenzene or zinc borate. Dark coloring agents or other conventional additives can also be incorporated.

When a combination of red phosphorous and one of the preferred metal oxides is added to glass-filled PET, the preferred concentration of each is independently about 2.4 to 5.0 weight percent based on the weight of glass-filled PET. Greater than 5.0 weight percent metal oxides has a significant deleterious effect on the physical properties of the PET, although greater than 5.0 weight percent metal oxide continues to enhance the fire retardant properties of the red phosphorous. Less than about 2.0 weight percent metal oxide shows only a marginal fire retardant enhancement effect.

Among the physical properties of glass-filled PET which we have found are improved by the incorporation therein of red phosphorous in comparison with glass-filled PET not containing red phosphorous are ultimate tensile strength, Izod impact strength, initial modulus of elasticity, and ultimate elongation. These properties shall be discussed in more detail hereinafter.

The flammability of polymers is generally evaluated by several tests including the Fenimore-Martin Oxygen Index Test and the Underwriters Laboratories Vertical Burn Test, UL 94. These tests are more fully described hereinafter. For present purposes of discussion, it need only be noted that glass-filled PET gives unacceptable results in both tests. The plastics industry has therefore expended substantial time and expense in an effort to provide a flame-retardant glass-filled PET which achieves an acceptable level of flame retardance without adverse effect on the physical, chemical or processing properties in comparison with ordinary glass-filled PET. Such efforts have heretofore not been completely successful.

Just why red phosphorous, which is soft, amorphous, and essentially insoluble in the PET, has an enhancing effect on the glass-filled PET physical properties is not known. Likewise, the reason for the potentiating effect of the metal oxide on the fire retardant effect of the red phosphorous is not known to the inventors. Indeed, although red phosphorous has been reported to have a flame retardant effect when incorporated into other polymer systems such as styrene/acrylonitrile and epoxy polymers, even in such cases, the reason for this latter effect is apparently unknown.

As is well known, the term "PET" connotes the polyester derived from terephthalic acid and ethylene glycol. The PET used in the instant invention may suitably have a number average molecular weight of 10,000 to 80,000 corresponding to an intrinsic viscosity ranging from about 0.3 to about 1.5 as determined in 60/40 phenol/tetrachloroethane at 25° C. Higher and lower molecular weight PET can, of course, be used but is not generally available.

The glass fibers incorporated into PET ordinarily have a length ranging from about 0.1 to 10 mm. and a diameter of 0.0005 to 0.025 mm. Glass fibers outside these lengths and diameter ranges can be used but are not generally commercially available and provide no significant advantage.

The red phosphorous containing, glass-filled PET of the instant invention can be formed into moulded articles, e.g. electrical connectors or structural parts for telephones, computers, and TV sets, small power tool housings, and the like, by conventional moulding techniques. It has all the fields of use of conventional glass-filled PET plus additional ones provided by its superior physical properties and flame retardance. For example, in many electrical apparatus such as TV sets, glass-filled PET is too inflammable for the fabrication of small parts such as brackets, chassis support components, or connectors. Our red phosphorous containing glass-filled PET is satisfactorily flame retardant and additionally, because of its superior physical properties, makes the apparatus more resistant to physical abuse such as dropping during shipment or other handling.

It should also be noted, as heretofore indicated, that the beneficial physical property and fire retardant effects of the combination of red phosphorous and metal oxide can also be imparted to non-glass-filled PET. The desired metal oxide and red phosphorous concentrations and particle size are the same as for glass-filled PET. In this case, one achieves a fire retardant PET which can be extruded in filament form and thereafter transformed into various fibers and fabrics analogous to conventional unfilled PET. The only limitation is that the added red phosphorous and metal oxide affect the color of the unfilled PET so that it cannot be used in applications where light or brightly colored PET is desired. Where the phosphorous containing unfilled PET is moulded, the moulded article has physical properties superior to conventional unfilled PET and is fire retardant as well. With glass-filled PET, the color of the material is ordinarily not significant, but if desired, the phosphorous containing glass-filled PET can be colored any desired dark shade by conventional coloring agents.

TEST METHODS

Ultimate tensile strength, ultimate elongation, and initial modulus are all determined in accordance with ASTM Test Method D638 using a head speed of 0.1 inches/min.

Tensile strength is expressed in pounds per square inch, ultimate elongation in percent, initial modules in pounds per square inch/$10^6$ and Izod notch impact strength in ft. pounds/inch notch.

Izod notch impact strength was determined in accordance with ASTM Test Method D256-61 at 23° C. and 50% relative humidity.

The Fenimore-Martin Oxygen Index Test employs a vertical glass tube 6.0 cm. high and 8.4 cm. in diameter, in which a rod or strip specimen 8 cm. long is held vertically by a clamp at its bottom end. A mixture of oxygen and nitrogen is metered into the bottom of the tube, passing through a bed or glass beads at the bottom to smooth the flow of gas. The sample is ignited at its upper end with a hydrogen flame which is then withdrawn, and the atmosphere that permits steady burning down of the specimen is determined. The limiting oxygen index is the minimum fraction of oxygen in a nitrogen mixture which will just permit the sample to burn. Materials which have a limiting oxygen index greater than 0.21 are self-extinguishing after ignition in air if allowed to burn in the same manner as the test, i.e., from the top down.

The vertical Burn Test (Underwriter Laboratory Test Method No. 94) is used to judge whether or not a material of a given thickness can be classified as "self-extinguishing." It has subgroupings as follows: SE-O if it extinguishes within 5 sec. (avg.) and does not drip flaming particles; SE-I, if it extinguishes within 25 sec. (avg.) and does not drip flaming particles; SE-II, if it extinguishes within 25 sec. (avg.) but releases flaming particles or drips during that time. Materials which are not self-extinguishing are categorized as N.R. (non-rated). Ordinary glass-filled PET is N.R.

The SE-O flammability index is a new classification that was designed to identify materials that can meet the more severe safety requirements of certain electrical apparatus that experience has shown can pose a specific fire hazard; for example, enclosures of switches used for TV receivers.

Test specimens are 6" in length by ½" in width by either ¼", ⅛", or ¹⁄₁₆" in thickness. It is harder, of course, to obtain an SE-O rating with ¹⁄₁₆" thick specimen than with thicker test specimens. The specimen is clamped vertically and a blue Bunsen burner flame applied to the bottom end of the specimen for a period of 10 seconds and then removed and the duration of flaming or glowing combustion of the specimen is noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen again noted.

If the specimen drips flaming particles or droplets while burning in this test, these drippings are allowed to fall onto a horizontal layer of cotton fibers (untreated surgical cotton) placed 1 ft. below the test specimen. Significant flaming particles are considered to be those capable of igniting the cotton fibers.

The duration of flaming or glowing combustion of vertical specimens after application of the test flame, average of three specimens (6 flame applications) shall not exceed 25 seconds (maximum any specimen not more than 30 seconds) and the portion of the specimen outside the clamp shall not be completely burned in the test. These requirements apply to the specimens tested both before and after aging in an oven at 70° C. (158F) for 7 days.

As heretofore indicated, materials which comply with the above requirements and do not drip any flaming particles or droplets during the burning test will classify as "Self-Extinguishing, Group I." (SE–I)

Materials which comply with the above requirements but drip flaming particles or droplets which burn only briefly during the test will classify as "Self-Extinguishing, Group II." (SE–II)

The standard for SE–O is the same as for SE–I except the three specimen average cannot exceed 5 seconds and the maximum for any single specimen cannot be over 10 seconds.

In all the following examples, the same PET having an initial intrinsic viscosity of 0.6 deciliters per gram was utilized. The red phosphorous and metal oxides used had an average particle size of about 18μ with essentially no particles larger than 100μ. The fiber glass used had an average length of 4.0 mm. and an average diameter of about 0.002 mm.

Test samples were formed as follows: PET pellets and the desired amount of red phosphorous, metal oxide and fiber glass were mixed in a Buchler rotator. This mixture was then extruded in a Brabender extruder and the extrudate then chopped onto pellets and the pellets then hot press molded to form the test strips. Because of the effect on physical properties of the extrusion process, the test samples will vary from example to example and numerical results for different examples are not directly comparable to each other although results within a given example are comparable.

EXAMPLE 1

The following flammability test results were obtained on PET containing varying amounts of red phosphorous, glass fiber and metal oxide.

| Sample | Weight percent | | | | Test results—Vertical burn test | | |
|---|---|---|---|---|---|---|---|
| | Red p | Glass fiber | Metal oxide, MgO | *O.I.T. | **Sample thickness, in. | Rating | |
| 1 | 0 | 0 | 0 | 27.5 | ¼ | N.R. | |
| 2 | 0 | 30 | 0 | 23.0 | ¼ | N.R. | |
| 3 | 3.0 | 0 | 0 | 33.0 | 1/16 | SE–O | |
| 4 | 3.0 | 0 | 2.0 | 34.0 | 1/16 | SE–O | |
| 5 | 1.0 | 0 | 2.0 | 33.8 | 1/16 | SE–O | |
| 6 | 1.0 | 0 | 0 | 30.5 | ⅛ | SE–O | |
| 7 | 0 | 0 | 2.0 | 28.0 | ¼ | N.R. | |
| 8 | 0 | 10 | 0 | 26.0 | ¼ | N.R. | |
| 9 | 0 | 20 | 0 | 24.0 | ¼ | N.R. | |
| 10 | 0 | 30 | 0 | 23.0 | ¼ | N.R. | |
| 11 | 0 | 40 | 0 | 22.5 | ¼ | N.R. | |
| 12 | 3.0 | 30 | 0 | 31.0 | ⅛ | SE–O | |
| 13 | 5.0 | 30 | 0 | 32.5 | 1/16 | SE–O | |
| 14 | 1.0 | 30 | 2.0 | 31.8 | 1/16 | SE–O | |
| 15 | 3.0 | 30 | 5.0 | 32.2 | 1/16 | SE–O | |
| 16 | 3.0 | 30 | ¹2.0 | 31.5 | 1/16 | SE–O | |
| 17 | 3.0 | 30 | ²2.0 | 31.0 | 1/16 | SE–O | |
| 18 | 3.0 | 30 | ³2.0 | 32.0 | 1/16 | SE–O | |

¹ TiO$_2$.  ² ZnO.  ³ Al$_2$O$_3$.
*Oxygen Index Test.
**Where SE–O rating achieved sample thickness is thinnest giving SE–O.

EXAMPLE 2

The following physical property test results were obtained on samples of PET containing 30 wt. percent fiber glass and varying amounts of red phosphorous and magnesium oxide.

| Sample | Weight percent | | Test results | | | |
|---|---|---|---|---|---|---|
| | Red p | MgO | Izod | UTS | UE | Modulus |
| 1 | 0.0 | 0 | 1.1 | 2,757 | 0.42 | 0.726 |
| 2 | 0.5 | 0 | 1.15 | 2,800 | 0.42 | 0.730 |
| 3 | 1.0 | 0 | 1.18 | 2,850 | 0.45 | 0.733 |
| 4 | 2.0 | 0 | 1.20 | 2,910 | 0.51 | 0.745 |
| 5 | 3.0 | 0 | 1.25 | 3,327 | 0.63 | 0.768 |
| 6 | 4.0 | 0 | 1.28 | 4,402 | 0.74 | 0.779 |
| 7 | 5.0 | 0 | 1.3 | 4,901 | 0.82 | 0.785 |
| 8 | 8.0 | 0 | 1.21 | 4,124 | 0.76 | 0.835 |
| 9 | 10.0 | 0 | 1.12 | 3,810 | 0.63 | 0.950 |
| 10 | 0.0 | 2.0 | 1.04 | 2,502 | 0.39 | 0.699 |
| 11 | 0.0 | 4.0 | 0.8 | 2,101 | 0.37 | 0.718 |
| 12 | 0.0 | 5.0 | 0.55 | 2,050 | 0.32 | 0.750 |
| 13 | 2.0 | 4.0 | 1.04 | 2,260 | 0.35 | 0.730 |
| 14 | 2.0 | 2.0 | 1.10 | 2,621 | 0.35 | 0.720 |
| 15 | 3.0 | 2.0 | 1.10 | 2,754 | 0.37 | 0.699 |
| 16 | 3.0 | 4.0 | 1.06 | 2,320 | 0.33 | 0.699 |

EXAMPLE 3

The following physical property test results were obtained on samples of PET containing either 0.0 or 3.0 wt. percent red phosphorous and varying amounts of fiber glass.

| Sample | Weight percent | | Test results | | |
|---|---|---|---|---|---|
| | Red p | Fiber glass | Izod | UTS | Modulus |
| 1 | 3.0 | 5.0 | 1.50 | 4,520 | 0.712 |
| 2 | 3.0 | 10.0 | 1.61 | 5,010 | 0.760 |
| 3 | 3.0 | 20.0 | 1.72 | 5,641 | 0.880 |
| 4 | 3.0 | 30.0 | 1.8 | 6,095 | 0.956 |
| 5 | 3.0 | 40.0 | 1.92 | 6,320 | 0.940 |
| 6 | 0.0 | 5.0 | 1.33 | 2,910 | 0.699 |
| 7 | 0.0 | 10.0 | 1.42 | 3,270 | 0.721 |
| 8 | 0.0 | 20.0 | 1.51 | 3,620 | 0.870 |
| 9 | 0.0 | 30.0 | 1.66 | 4,080 | 0.968 |
| 10 | 0.0 | 40.0 | 1.68 | 5,120 | 0.925 |

EXAMPLE 4

The following physical property test results were obtained on samples of unfilled PET containing varying amounts of red phosphorous and MgO.

| Sample | Weight percent | | Test results | |
|---|---|---|---|---|
| | Red p | MgO | Izod | UTS |
| 1 | 0.5 | 0 | .68 | 7,118 |
| 2 | 1.0 | 0 | .72 | 7,325 |
| 3 | 2.5 | 0 | .85 | 7,520 |
| 4 | 5.0 | 0 | .80 | 7,911 |
| 5 | 7.5 | 0 | .73 | 7,818 |
| 6 | 10.0 | 0 | .51 | 6,310 |
| 7 | 4.0 | 2.0 | .8 | 7,315 |
| 8 | 4.0 | 4.0 | .62 | 7,150 |
| 9 | 0 | 0 | .6 | 7,030 |
| 10 | 0 | 4.0 | .48 | 6,510 |

EXAMPLE 5

The affect of a number of metal oxides on physical properties were evaluated using PET containing 3.0 wt. percent red phosphorous, 30 wt. percent glass fiber, and 4.0 wt. percent metal oxide.

| Result | Metal oxide | Test results | | | |
|---|---|---|---|---|---|
| | | Izod | UTS | UE | Modulus |
| 1 | MgO | 1.15 | 3,680 | 0.75 | 0.801 |
| 2 | TiO$_2$ | 1.20 | 3,920 | 0.74 | 0.822 |
| 3 | ZnO | 1.28 | 4,132 | 0.81 | 0.875 |
| 4 | MoO$_3$ | 1.19 | 4,340 | 0.84 | 0.871 |
| 5 | Al$_2$O$_3$ | 1.08 | 3,820 | 0.68 | 0.785 |
| 6 | Zr$_2$O$_3$ | 1.21 | 3,740 | 0.72 | 0.831 |
| 7 | B$_2$O$_3$ | 1.05 | 3,120 | 0.63 | 0.765 |
| 8 | MNO$_2$ | 1.18 | 4,215 | 0.74 | 0.813 |
| 9 | Pb$_2$O$_3$ | 1.24 | 4,322 | 0.85 | 0.830 |
| 10 | Sb$_2$O$_5$ | 1.27 | 4,379 | 0.88 | 0.891 |

We claim:
1. A composition comprising:
 (a) polyethylene terephthalate
 (b) from 0.5 to 10 weight percent of finely particulate red phosphorus
 (c) from 2.0 to 5.0 weight percent of a metal oxide selected from the group consisting of MgO, TiO$_2$, ZnO, MoO$_3$, Al$_2$O$_3$, Zr$_2$O$_3$, Cr$_2$O$_3$, Wo$_2$O$_3$, B$_2$O$_3$, MnO$_2$, CdO, SnO, Pb$_2$O$_3$, Bi$_2$O$_3$, Sb$_2$O$_5$.

2. A composition in accordance with claim 1 wherein said composition contains as an additional component from about 5 to about 40 weight percent glass fiber.

3. A composition in accordance with claim 1 wherein said phosphorous is present in an amount ranging from from about 2 to about 5 weight percent.

4. A composition in accordance with claim 1 wherein said phosphorous has a particle size of no greater than about 25μ.

5. A composition in accordance with claim 1 wherein said metal oxide is MgO, $TiO_2$, ZnO, $MoO_3$, or $Al_2O_3$.

6. A composition in accordance with claim 5 wherein said metal oxide is MgO.

7. A composition in accordance with claim 1 wherein said metal oxide is MgO, said red phosphorous is present in an amount ranging from about 2 to about 5 weight percent, both said red phosphorous and said MgO have a maximum particle size of 25μ and wherein said composition contains as an additional component about 5 to about 40 weight percent glass fiber.

8. A process for enhancing the fire retardance of polyethylene terephthalate comprising adding to said polyethylene terephthalate from 0.5 to 10.0 weight percent finely particulate red phosphorous.

9. A composition comprising:
   (a) polyethylene terephthalate and
   (b) from 0.5 to 10 weight percent of finely particulate red phosphorous.

10. A composition as claimed in claim 9 additionally including from about 5 to about 40 weight percent glass fiber.

11. A composition as claimed in claim 9 wherein said phosphorous is present in an amount ranging from about 2 to about 5 weight percent.

12. A composition as claimed in claim 9 wherein said red phosphorous has a particle size of no greater than about 25μ.

References Cited

UNITED STATES PATENTS

| | | | |
|---|---|---|---|
| 3,368,995 | 2/1968 | Furukawa et al. | 260—40 R |
| 3,477,982 | 11/1969 | Dijkstra et al. | 260—45.7 P |
| 3,624,024 | 11/1971 | Caldwell et al. | 260—40 R |

FOREIGN PATENTS

| | | |
|---|---|---|
| 1,147,009 | 4/1969 | Great Britain. |
| 1,157,419 | 7/1969 | Great Britain. |

MORRIS LIEBMAN, Primary Examiner

S. M. PERSON, Assistant Examiner

U.S. Cl. X.R.

260—45.7 P, DIG. 24

PO-1050
(5/69)

UNITED STATES PATENT OFFICE
CERTIFICATE OF CORRECTION

Patent No. 3,847,861          Dated November 12, 1974

Inventor(s) Theodore Largman and Herman Stone

It is certified that error appears in the above-identified patent and that said Letters Patent are hereby corrected as shown below:

In the following lines change "phosphorous" to --phosphorus--.

Column 1, lines 13, 17, 56, 62, 63, 70

Column 2, lines 4, 9, 10, 11, 15, 17, 22, 25, 28, 31, 35-36, 40, 43, 46, 50, 53, 56, 64

Column 3, lines 1, 6, 7, 24, 29, 30, 49, 59-60, 66, 68, 73

Column 4, lines 1, 6

Column 5, lines 21, 27, 41, 74

Column 6, lines 20, 38, 54

Column 7, lines 5, 8, 15, 17, 24, 28

Column 8, lines 5 and 8

Signed and sealed this 18th day of February 1975.

(SEAL)
Attest:

RUTH C. MASON
Attesting Officer

C. MARSHALL DANN
Commissioner of Patents
and Trademarks